(12) United States Patent
Yokota

(10) Patent No.: US 8,215,102 B2
(45) Date of Patent: Jul. 10, 2012

(54) PARTICULATE FILTER REGENERATION APPARATUS AND METHOD OF OPERATING THE SAME

(75) Inventor: Youji Yokota, Kariya (JP)

(73) Assignee: Denso Corporation, Kariya (JP)

( * ) Notice: Subject to any disclaimer, the term of this patent is extended or adjusted under 35 U.S.C. 154(b) by 315 days.

(21) Appl. No.: 12/500,104

(22) Filed: Jul. 9, 2009

(65) Prior Publication Data

US 2010/0011748 A1   Jan. 21, 2010

(30) Foreign Application Priority Data

Jul. 18, 2008  (JP) ................................. 2008-187588

(51) Int. Cl.
*F01N 3/00* (2006.01)
*F01N 3/10* (2006.01)
(52) U.S. Cl. ................................ 60/286; 60/295; 60/303
(58) Field of Classification Search .................... 60/274, 60/282, 290, 295, 286, 297, 303, 311
See application file for complete search history.

(56) References Cited

U.S. PATENT DOCUMENTS

2008/0314031 A1 * 12/2008 Shamis et al. .................. 60/295

FOREIGN PATENT DOCUMENTS

| EP | 1 582 707 | 10/2005 |
|---|---|---|
| JP | UM S59-000521 | 1/1984 |
| JP | 09-222009 | 8/1997 |
| JP | 2002-061555 | 2/2002 |
| JP | 2005-282421 | 10/2005 |
| JP | 2006-138261 | 6/2006 |
| JP | 2009-257235 | 11/2009 |

OTHER PUBLICATIONS

Japanese Action dated Apr. 27, 2010, issued in corresponding Japanese Application No. 2008-187588, with English translation.

* cited by examiner

*Primary Examiner* — Thomas Denion
*Assistant Examiner* — Audrey K Bradley
(74) *Attorney, Agent, or Firm* — Nixon & Vanderhye P.C.

(57) ABSTRACT

The particulate filter regeneration apparatus includes a driving function for driving an exhaust pipe injector to inject fuel into an exhaust pipe of an internal combustion engine by energizing an actuator of the exhaust pipe injector in order to regenerate a particulate filter provided in the exhaust pipe for collecting particulate matter contained in exhaust gas of the engine, a shutoff function for shutting off fuel supply to the exhaust pipe injector, and a diagnosis function of performing a diagnostic process in which the fuel shutoff function is caused to shut off fuel supply to the exhaust pipe injector, and the driving function is caused to energize the actuator in a state of fuel supply to the exhaust pipe injector being shut off by the shutoff function in order to make a determination whether the actuator is energized normally by the driving function.

2 Claims, 7 Drawing Sheets

FIG.4

| | FAULT MODE | WAVEFORM PATTERN | | FALLING EDGE OF Sb | FALLING EDGE OF Sc |
|---|---|---|---|---|---|
| [0] | NORMAL OPERATION | Sa ⎯⎯⎯⎯⎯⎯⎯ 20ms OR LONGER<br>Im ⎯⎯⎯⎯⎯⎯⎯<br>Sb ⎯⎯⎯⎯⎯⎯⎯<br>Sc ⎯⎯⎯⎯⎯⎯⎯ | | ONCE | THREE TIMES OR MORE |
| [1] | HIGH-SIDE SHORT CIRCUIT TO GROUND LINE | Sa ⎯⎯⎯⎯⎯⎯⎯<br>Im ⎯⎯⎯⎯⎯⎯⎯ 0<br>Sb ⎯⎯⎯⎯⎯⎯⎯ Hi<br>Sc ⎯⎯⎯⎯⎯⎯⎯ | | NOT OCCURRED | ONCE |
| [2] | LOW-SIDE SHORT CIRCUIT TO GROUND LINE | | | | |
| [3] | HIGH-SIDE SHORT CIRCUIT TO +B | Sa ⎯⎯⎯⎯⎯⎯⎯<br>Im ⎯⎯⎯ Ip<br>Sb ⎯⎯⎯⎯⎯⎯⎯<br>Sc ⎯⎯⎯ : LOW-SIDE SHORT CIRCUIT | | ONCE | ONCE |
| [4] | LOW-SIDE SHORT CIRCUIT TO −B | | | | |
| [5] | HIGH-SIDE BREAK | Sa ⎯⎯⎯⎯⎯⎯⎯<br>Im ⎯⎯⎯⎯⎯⎯⎯ 0<br>Sb ⎯⎯⎯⎯⎯⎯⎯ Hi<br>Sc ⎯⎯⎯⎯⎯⎯⎯ | | NOT OCCURRED | ONCE |
| [6] | LOW-SIDE BREAK | | | | |

PARTICULATE FILTER REGENERATION APPARATUS AND METHOD OF OPERATING THE SAME

CROSS-REFERENCE TO RELATED APPLICATION

This application is related to Japanese Patent Application No. 2008-187588 filed on Jul. 15, 2008, the contents of which are hereby incorporated by reference.

BACKGROUND OF THE INVENTION

1. Field of the Invention

The present invention relates to an apparatus for regenerating a particulate filter for collecting particulate matter contained in exhaust gas from an engine.

2. Description of Related Art

Exhaust gas discharged from an internal combustion engine, a diesel engine for example, contains particulate matter (may be referred to as "PM" hereinafter) such as soluble organic matter and soot. Accordingly, it is common to provide a vehicle with a particulate filter to collect PM to clean the exhaust gas, and burn off the collected PM to regenerate the particulate filter.

It is known, as a method of regenerating a particulate filter, to cause an injector provided in an exhaust pipe of an engine (referred to as "exhaust pipe injector" hereinafter) to inject fuel into the exhaust pipe in order to raise the temperature of the exhaust gas utilizing the oxidation reaction heat generated by the oxidation reaction between the injected fuel and a diesel oxidation catalyst (may be referred to as "DOC" hereinafter), to thereby heat and burn off particulate matter collected in the particulate filter. For more details, refer to Japanese Patent Application Laid-open No. 9-222009.

The exhaust pipe injector is configured to open when an actuator thereof such as a solenoid is energized. It is also known that an apparatus for regenerating a particulate filter is provided with a function of performing fault diagnosis on the drive system of an exhaust pipe injector by causing a driver circuit of the drive system to actually energize an actuator of the exhaust pipe injector, and judges whether the drive system is functioning normally by monitoring the energization state of the actuator. Such a fault diagnosis is performed when the exhaust pipe injector is driven to regenerate the particulate filter.

However, since the regeneration of the particulate filter is performed with frequency as low as once per several thousand kilometers traveled by the vehicle, the frequency of performing the fault diagnosis is also low, which causes delay between occurrence of a fault and detection of the fault. It is common that only after a fault is detected a predetermined number of times, a determination of presence of the fault is made. Accordingly, in this case, the time between occurrence of a fault in the drive system of the exhaust pipe injector and determination of presence of the fault is further lengthened.

In addition, the period of time during which the exhaust pipe injector is driven to regenerate the particulate filter is not always constant. When the exhaust pipe injector is driven for only a short period of time, it may not be possible to accurately perform the fault diagnosis.

Furthermore, in a configuration where the exhaust pipe injector is forcibly driven by a request command from an external fault diagnosis apparatus, it is not preferable to forcibly drive the exhaust pipe injector at arbitrary times in view of the efficiency of regeneration of the particulate filter and engine control, because it needs to inject extra fuel into the exhaust pipe.

SUMMARY OF THE INVENTION

The present invention provides a particulate filter regeneration apparatus comprising:

a driving function for driving an exhaust pipe injector to inject fuel into an exhaust pipe of an internal combustion engine by energizing an actuator of the exhaust pipe injector in order to regenerate a particulate filter provided in the exhaust pipe for collecting particulate matter contained in exhaust gas of the engine;

a shutoff function for shutting off fuel supply to the exhaust pipe injector; and a diagnosis function of performing a diagnostic process in which the fuel shutoff function is caused to shut off fuel supply to the exhaust pipe injector, and the driving function is caused to energize the actuator in a state of fuel supply to the exhaust pipe injector being shut off by the shutoff function in order to make a determination whether the actuator is energized normally by the driving function.

The present invention provides also a particulate filter regeneration apparatus comprising:

a driving function for driving an exhaust pipe injector to inject fuel into an exhaust pipe of an internal combustion engine by energizing an actuator of the exhaust pipe injector in order to regenerate a particulate filter provided in the exhaust pipe for collecting particulate matter contained in exhaust gas of the engine;

a shutoff function for shutting off fuel supply to the exhaust pipe injector; and a control function of causing the shutoff function to shut off fuel supply to the exhaust pipe injector, and causing the driving function to energize the actuator in a state of fuel supply to the exhaust pipe being shut off by the shutoff function upon receiving a command to forcibly drive the exhaust pipe injector from an external apparatus.

The present invention also provides a particulate filter regeneration apparatus comprising:

a driving function for driving an exhaust pipe injector to inject fuel into an exhaust pipe of an internal combustion engine by energizing an actuator of the exhaust pipe injector in order to regenerate a particulate filter provided in the exhaust pipe for collecting particulate matter contained in exhaust gas of the engine; and a shutoff function for shutting off fuel supply to the exhaust pipe injector, the shutoff function being configured to shut off fuel supply to the exhaust pipe injector when the driving function is driven for a purpose other than regeneration of the particulate filter.

The present invention also provides a particulate filter regeneration apparatus comprising:

a driving function for driving an exhaust pipe injector to inject fuel into an exhaust pipe of an internal combustion engine by energizing an actuator of the exhaust pipe injector in order to regenerate a particulate filter provided in the exhaust pipe for collecting particulate matter contained in exhaust gas of the engine; and a control function configured to supply fuel to the exhaust pipe injector only when the control function causes the driving function to energize the actuator to regenerate the particulate filter.

The present invention also provides a method of operating a particulate filter regeneration apparatus including a driving function for driving an exhaust pipe injector to inject fuel into an exhaust pipe of an internal combustion engine in order to regenerate a particulate filter provided in the exhaust pipe for collecting particulate matter contained in exhaust gas of the engine, and a fuel supply shutoff function for shutting off fuel supply to the exhaust pipe injector, the method comprising the steps of:

driving the exhaust pipe injector to inject fuel into the exhaust pipe by energizing an actuator of the exhaust pipe injector to regenerate the particulate filter; and causing the driving function to energize the actuator while causing the fuel shutoff function to shut of fuel supply to the exhaust pipe injector to perform diagnosis on the driving function.

According to the present invention, it is possible to perform diagnosis on the drive system of an exhaust pipe injector, and to forcibly drive the exhaust pipe injector at any timing.

Other advantages and features of the invention will become apparent from the following description including the drawings and claims.

BRIEF DESCRIPTION OF THE DRAWINGS

In the accompanying drawings:

FIG. 4 is an explanatory view for explaining operation of the exhaust pipe injector when there is a fault in a drive system for driving the exhaust pipe injector.

PREFERRED EMBODIMENTS OF THE INVENTION

Figure 1:
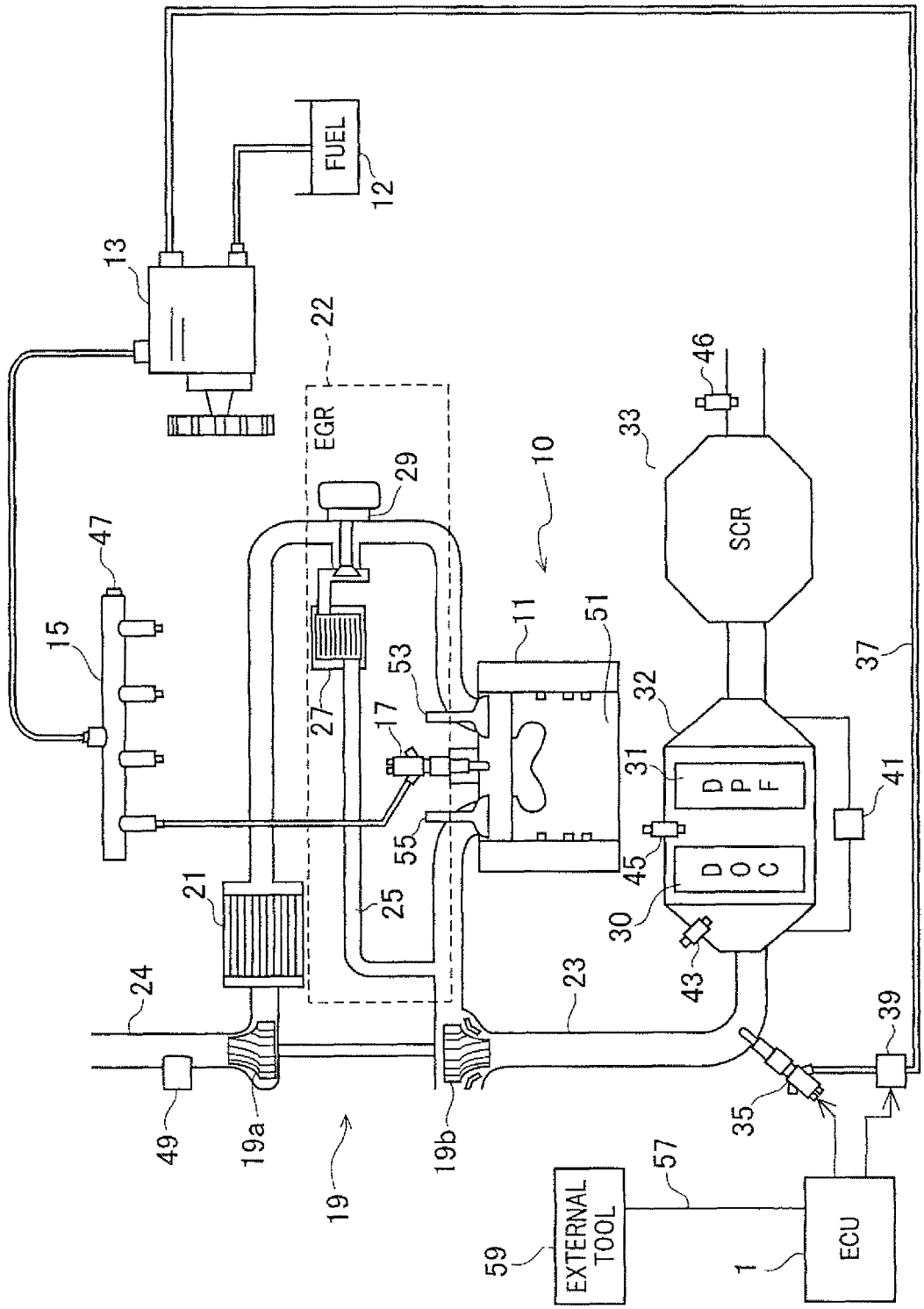
FIG. 1 is a diagram showing structures of apparatuses which are disposed around a diesel engine mounted on a vehicle and controlled by an engine control apparatus (ECU) according to a first embodiment of the invention.

FIG. 1 is a diagram showing structures of apparatuses which are disposed around a diesel engine 10 mounted on a vehicle and controlled by an engine control apparatus (referred to as "ECU" hereinafter) 1 according to a first embodiment of the invention.

A fuel pump 13 pressure-feeds fuel from a fuel tank 12 to a common rail 15 from which fuel is supplied to injectors 17 of cylinders 11 (only one of the cylinders 11 is shown in the drawing). The injector 17 is driven to open to inject fuel into the cylinder 11.

The cylinder 11 is supplied with air from the atmosphere through a compressor 19a of a turbocharger 19 and an intercooler 21 (the air being referred to as "fresh air" hereinafter), and also a part of the exhaust gas discharged from the engine 10 through an EGR (Exhaust Gas Recirculating) system 22.

An EGR passage 25 is disposed between the upstream side of a turbine 19b of the turbocharger 19 disposed in an exhaust passage of the engine 10 and the downstream side of the intercooler 21 disposed in an intake passage 24 of the engine 10. The EGR passage is provided with an EGR cooler 27 and an EGR valve 29. A part of the exhaust gas is sucked into the cylinder 11 through the EGR cooler 27 together with fresh air when the EGR valve 29 is driven to open.

An exhaust pipe 23 constituting the exhaust passage at the downstream of the turbine 19b is provided with a filter housing section 32 housing a DOC (Diesel Oxide Catalyst) 30 in a front part thereof and a DPF (Diesel Particulate Filter) 31 for collecting PM in a rear part thereof. At the downstream side of the filter housing section 32, an SCR (Selective Catalytic Reduction) system 33 is disposed to reduce concentration of NOx contained in the exhaust gas. In this embodiment, the SCR system 33 is a urea-SCR system which injects urea water into the exhaust gas to generate ammonia gas through hydrolysis of urea water by which NOx contained In the exhaust gas is reduced into $N_2$ gas and $H_2O$ (water vapor).

The exhaust pipe 23 is provided with an exhaust pipe injector 35 between the turbine 19b and the filter housing section 32 for regenerating the DPF 31 by injecting fuel into the exhaust pipe 23 to generate heat from the oxidation reaction at the DOC 30. The exhaust pipe injector 35 is supplied with fuel from the fuel tank 12 by a fuel pump 13 through a fuel supply passage 37 different from a fuel supply passage leading to the common rail 15. The fuel supply passage 37 is provided with a fuel cut valve 39 in the vicinity of the exhaust pipe injector 35, which is driven to close to shut off fuel supply to the exhaust pipe injector 35.

The filter housing section 32 is provided with a differential pressure sensor 41 for measuring the differential pressure between inlet and outlet thereof (the differential pressure between the upstream side of the DOC 30 and the downstream side of the DPF 31), a temperature sensor 43 for measuring the exhaust gas temperature at the upstream side of the DOC 30, and a temperature sensor 45 for measuring the exhaust gas temperature at the downstream side of the DOC 30 (at the upstream side of the DPF 31). The exhaust pipe 23 is provided with a NOx sensor 46 for measuring the concentration of NOx contained in the exhaust gas at the downstream of the SCR system 33.

The common rail 15 is provided with a common rail pressure sensor 47 for measuring the pressure in the common rail 15. The intake passage 24 is provided with an airflow meter 49 at the upstream side of the compressor 19a to measure the flow rate of the fresh air sucked into the engine 10. In FIG. 1, the reference numeral 51 denotes a piston in the cylinder 11, 53 denotes an intake valve of the cylinder 11, and 55 denotes an exhaust valve of the cylinder 11. Next, the schematic functions of the ECU 1 are explained. Although not shown in FIG. 1, the ECU 1 receives, as control data for controlling the engine 10, signals outputted from the above explained sensors 41 to 49, a rotation sensor for measuring the rotational speed of the engine 10, a water temperature sensor for measuring the temperature of engine cooling water, etc., and an ignition switch signal indicative of the on/off state of an ignition switch.

The ECU 1 executes various computations on the received signals, and controls the engine 10 and the apparatuses disposed around the engine 10 in accordance with the computation results. For example, the ECU 1 drives the fuel pump 13 such that the common rail pressure measured by the common rail pressure sensor 47 is kept at a target value while the ignition switch is on, calculates fuel injection amount and injection timing on the basis of the flow rate of fresh air measured by the airflow meter 49, engine rotational speed calculated from the output signal of the rotation sensor, etc., and drive the injector 17 in accordance with the calculation results. The ECU 1 also adjusts the opening degree of the EGR valve 29 in accordance with the engine rotational speed etc. The ECU 1 also drives an actuator of the SCR system to inject urea water in accordance with the concentration of NOx measured by the NOx sensor 46. The ECU 1 also calculates an injection amount of fuel necessary to regenerate the DPF 31 on the basis of the exhaust gas temperatures measured by the temperature sensors 43 and 45 etc., when it determines that regeneration of the DPF 31 should be performed on the basis of the differential pressure measured by the differential pressure sensor etc., and drives the exhaust pipe injector 35 such that the calculated amount of fuel is supplied to the DOC 30. Instead of driving the exhaust pipe injector 35, the injector 17 may be driven during an exhaust stroke of the cylinder 11 (post injection) to supply fuel to the DOC 30 in order to regenerate the DPF 31.

As shown in FIG. 1, the ECU 1 is connected to a communication line 57 laid in the vehicle. An external tool 59 which operates as an external diagnosis apparatus is detachably connected to the communication line 57. The ECU 1 can perform communication with the external tool 59 through the communication line 57.

Figure 2:
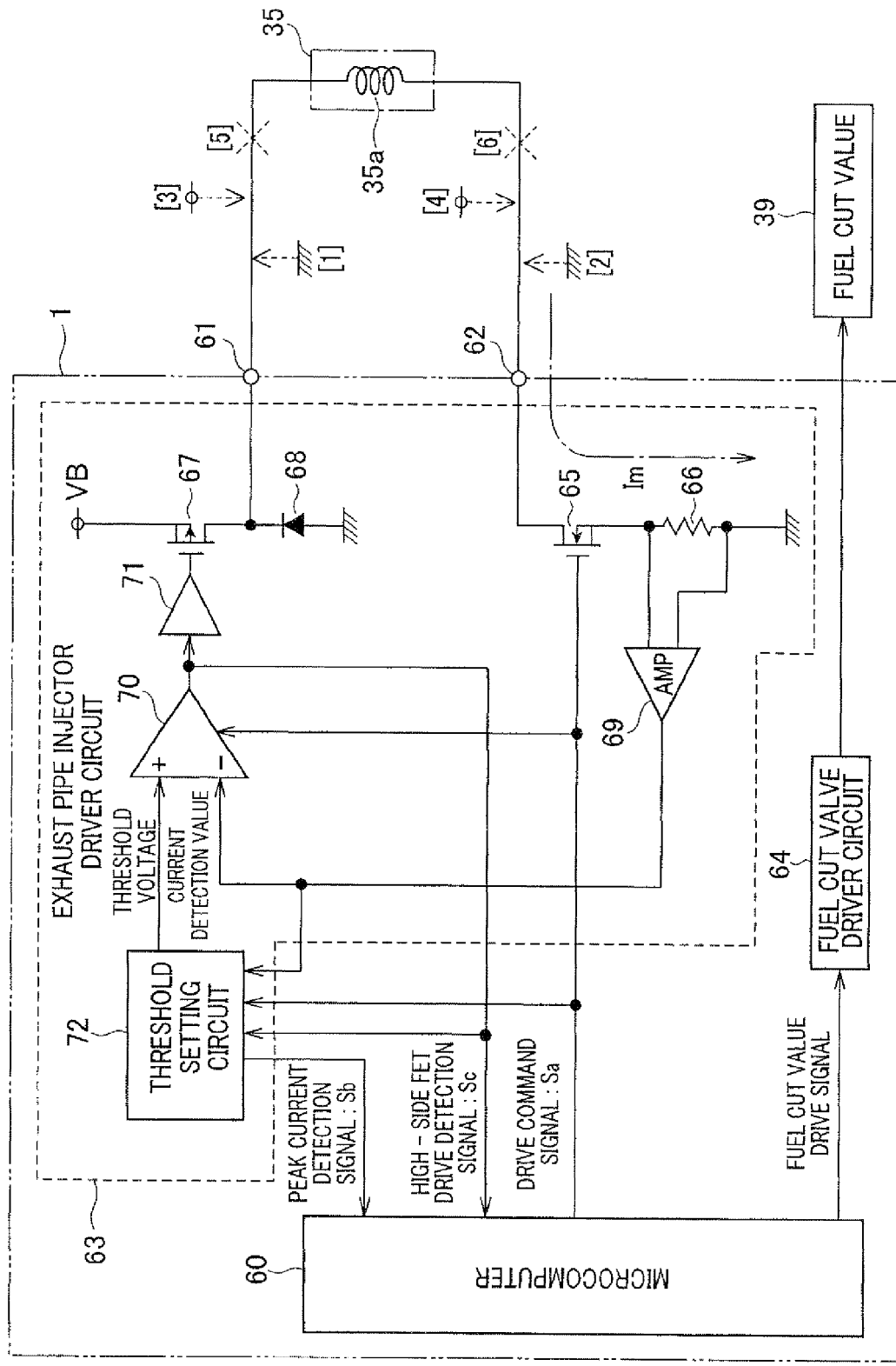
FIG. 2 is a diagram showing a part of the structures of the ECU, which operates to drive an exhaust pipe injector and a fuel cut valve.

The various functions of the ECU 1 explained above are implemented by a microcomputer 60 included in the ECU 1 executing various programmed processes. Next, a part of the structure of the ECU 1 which operates to drive the exhaust pipe injector 35 and the fuel cut valve 39 is explained with reference to FIG. 2.

The exhaust pipe injector 35 is a solenoid-type injector including a solenoid as an actuator. When a coil 35*a* of the solenoid is energized, the valve body of the fuel cut valve 35 moves to a valve open position to inject fuel. When the coil 35*a* is deenergized, the valve body of the fuel cut valve 35 moves to a valve close position to stop fuel injection.

The ECU 1 includes, other than the microcomputer 60, a terminal 61 connected to one end of the coil 35*a*, a terminal 62 connected to the other end of the coil 35*a*, a exhaust pipe injector driver circuit 63, and a fuel cut valve driver circuit 64.

The exhaust pipe injector driver circuit 63 includes a FET 65 one output terminal of which is connected to the terminal 62 (may be referred to as "low-side FET 65" hereinafter), a resistor 66 connected between the other output terminal of the FET 65 and the ground line at the ground potential (0 V), a FET 67 one output terminal of which is applied with a battery voltage VB (the output voltage of a vehicle battery) and the other output terminal of which is connected to the terminal 61 (may be referred to as high-side FET 67" hereinafter), and a diode 68 whose anode is connected to the ground line and whose cathode is connected to the terminal 61.

Accordingly, when the low-side FET 65 and the high-side FET 67 are on, a current flows in the sequence of the battery, the high-side FET 67, the low-side FET 65, the resistor 66, and the ground line. When the high-side FET 67 is turned off while the low-side FET 65 is on, a current circulates in the sequence of the ground line, the diode 68, the coil 35*a*, the low-side FET 65, and the ground line.

The gate of the low-side FET 65 is applied with a drive command signal Sa outputted from the microcomputer 60. The low-side FET 65 is on while the drive command signal Sa is at the high level, and is off while drive command signal Sa is at the low level.

While the drive command signal Sa is at the high level, the coil 35*a* is energized to open the exhaust pipe injector 35. Accordingly, the microcomputer 60 sets the drive command signal Sa at the high level during a period in which the exhaust pipe injector should be driven to open.

The exhaust pipe injector driver circuit 63 further includes an amplifier 69, a comparator circuit 70, pre-driver circuit 71, and a threshold setting circuit 72. The amplifier circuit 69 amplifies the voltage across the resistor 66 to generate a voltage proportional to a monitor current Im flowing through the resistor 66.

The comparator circuit 70 compares a threshold voltage set by the threshold setting circuit 72 with the output of the amplifier circuit 69 when the drive command signal Sa outputted from the microcomputer 60 is at the high level. The comparator circuit 70 sets the output thereof which is applied to the pre-driver circuit 71 to the high level if the threshold voltage is detected to be higher than the output of the amplifier circuit 69, and to the low level if the threshold voltage is detected to be lower than or equal to the output of the amplifier circuit 69. On the other hand, when the drive command signal Sa is at the low level, the output of the comparator circuit 70 applied to the pre-driver circuit 71 is fixed to the low level.

The pre-driver circuit 71 turns on the high-side FET 67 when the output of the comparator circuit 70 is at the high level, and turns off the high-side FET 67 when the output of the comparator circuit 70 is at the low level. The output of the comparator circuit 70 is also inputted to the microcomputer 60 as a high-side FET drive detection signal Sc indicative of the on/off state of the high-side FET 67.

The threshold setting circuit 72 receives the drive command signal Sa from the microcomputer 60, the output of the amplifier circuit 69 and the output of the comparator circuit 70. The threshold setting circuit 72 has the following functions (1) to (3).

(1) Upon detecting that the drive command signal Sa from the microcomputer 60 becomes the low level, or the output of the amplifier circuit 69 becomes lower than a stop determining threshold value which is set near 0, the threshold setting circuit 72 sets the threshold voltage given to the comparator circuit 70 to a first threshold value corresponding to a peak current Ip, and sets a peak current detection signal Sb outputted to the microcomputer 60 to the high level.

Figure 3:
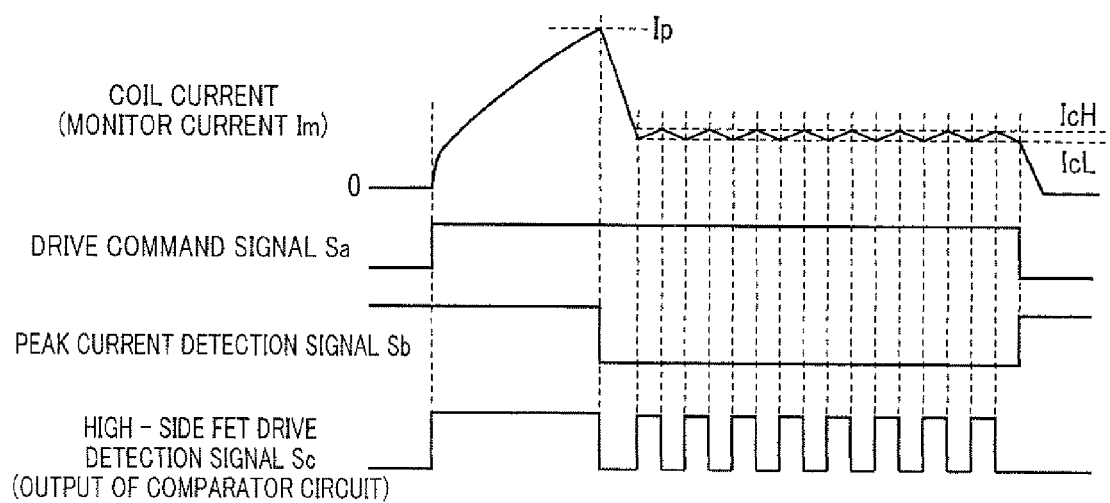
FIG. 3 is a time chart for explaining operation of an exhaust pipe injector driver circuit included in the ECU.

The peak current Ip is a maximum current (2.5 A, for example) to be supplied to the coil 35*a* at the beginning of the energization of the coil 35*a* (see FIG. 3). The first threshold value is a value of the output voltage of the amplifier circuit 69 when the peak current Ip flows through the resistor 66. The peak current detection signal Sb is a signal to inform, by its level change, the microcomputer 60 that the current flowing through the coil 35*a* (referred to as "coil current" hereinafter) has reached the peak current Ip.

(2) The threshold setting circuit 72 changes the threshold voltage given to the comparator circuit 70 from the first threshold value corresponding to the peak current Ip to a second threshold value corresponding to a lower limit control current IcL smaller than the peak current Ip, and resets the peak current detection signal Sb to the low level, when the output of the comparator circuit 70 changes from the high level to the low level after the drive command signal Sa outputted from the microcomputer 60 changed from the low level to the high level.

(3) Thereafter, until the drive command signal Sa outputted from the microcomputer 60 changes to the low level, the threshold setting circuit 72 repeats the operation in which the threshold voltage of the comparator circuit 70 is changed from the second threshold value to a third threshold value corresponding to a high limit control current IcH which is larger than the lower limit control current IcL and smaller than the peak current Ip when the output of the comparator circuit 70 changes from the low level to the high level, while on the other hand, changes the threshold voltage of the comparator circuit 70 from the third threshold value to the second threshold value when the output of the comparator circuit 70 changes from the high level to the low level.

The lower limit control current IcL and the higher limit control current IcH are respectively a minimum value and a maximum value of a current to be supplied to the coil 35a after the coil current reaches the peak current Ip. For example, the lower limit control current IcL is 1.3 A, and the higher limit control current IcH is 1.75 A (see FIG. 3). The second threshold value is a value of the output voltage of the amplifier circuit 69 when the lower limit control current IcL flows through the resistor 66. The third threshold value is a value of the output voltage of the amplifier circuit 69 when the high limit control current IcH flows through the resistor 66. The first to third threshold values and the stop determining threshold value are in a relationship of the first threshold value>the third threshold value>the second threshold value>the stop determining threshold value.

The fuel cut valve driver circuit 64 closes the fuel cut valve 39 when a fuel cut valve driving signal outputted from the microcomputer 60 becomes the active level (the high level, for example). The fuel cut valve 39 may be a normally-open type electromagnetic valve which closes when the coil thereof is energized. The fuel cut valve driver circuit 64 is a circuit including transistors for energizing the coil of the fuel cut valve.

Next, the operation of the exhaust pipe injector driver circuit 63 is explained with reference to FIG. 3.

State A: When the drive command signal Sa outputted from the microcomputer 60 is at the low level, no current flows through the coil 35a, because the low-side FET 65 is off and the output of the comparator circuit 70 is at the low level causing the high-side FET 67 to be off. In this state, the threshold voltage of the comparator circuit 70 is set to the first threshold value corresponding to the peak current Ip by the threshold setting circuit 72, and accordingly, the peak current detection signal Sb outputted from the peak setting circuit 72 to the microcomputer 60 is at the high level.

State B: When the drive command signal Sa outputted from the microcomputer 60 changes from the low level to the high level, the low-side FET 65 turns on, and since the first threshold value is larger than the output of the amplifier circuit 69, the output of the comparator 70 is at the high level causing the high-side FET 67 to turn on. Accordingly, a current starts to flow through the coil 35a.

State C: Thereafter, when the coil current (=the monitor current Im) reaches the peak current Ip, and accordingly the first threshed value becomes smaller than or equal to the output of the amplifier circuit 69, the output of the comparator circuit 70 becomes the low level. As a result, the high-side FET 67 turns off, the threshold of the comparator circuit 70 set by the threshold setting circuit 72 is changed to the second threshold value corresponding to the lower limit control current IcL, and the peak current detection signal Sb outputted from the threshold setting circuit 72 to the microcomputer 60 becomes the low level.

State D: As a result of the high-side FET 67 being turned off, the coil current decreases. When the coil current decreases down to the lower limit control current IcL, and the output of the amplifier circuit 69 becomes smaller than the second threshold value, the output of the comparator circuit 70 becomes the high level. As a result, the high-side FET 67 turns on again, and the threshold voltage of the comparator circuit 70 set by the threshold setting circuit 72 is changed to the third threshold value corresponding to the upper limit control current IcH.

State E: As a result of the high-side FET 67 being turned on, the coil current increases. When the coil current increases up to the higher limit control current IcH, and the output of the amplifier circuit 69 becomes larger than or equal to the third threshold value, the output of the comparator circuit 70 becomes the low level. As a result, the high-side FET 67 turns off, and the threshold voltage of the comparator circuit 70 set by the threshold setting circuit 72 is changed to the second threshold value corresponding to the lower limit control current IcL.

From then on, the state D and the state E alternate until the drive command signal Sa outputted from the microcomputer 60 becomes the low level. When the drive command signal Sa outputted from the microcomputer 60 becomes the low level, the exhaust pipe injector driver circuit 63 returns to the initial state A.

As explained above, when the drive command signal Sa outputted from the microcomputer 60 becomes the high level, the low-side FET 65 is turned on and also the high-side FET 67 is turned on until the coil current reaches the peak current Ip. Thereafter, the output of the comparator 70 repeatedly inverts to repeatedly turn on and off the high-side FET 70 so that a current of a value approximately intermediate between the lower limit control current IcL and the higher limit control current IcH flows through the coil 35a. When the coil current reaches the peak current Ip, the peak current detection signal Sb outputted from the threshold setting circuit 72 to the microcomputer 60 changes from the high level to the low level.

Next, the operation of the exhaust pipe injector driver circuit 63 when there is a fault in the driver system of the exhaust pipe injector 35 is explained with reference to FIG. 4.

In FIG. 4, the box [0] explains operation of the exhaust pipe injector driver circuit 63 when there is no fault, and each of the boxes [1]-[6] explain operation of the exhaust pipe injector driver circuit 63 when a fault occurs in each of the current passages [1]-[6] shown in FIG. 1, respectively.

As shown in the box [0], when there is no fault, a falling edge (an edge from the high level to the low level) occurs in the peak current detection signal Sb once during a period in which the drive command signal Sa outputted from the microcomputer 60 is at the high level, while on the other hand, a falling edge occurs a plurality of times in the high-side FET drive detection signal Sc as the output of the comparator circuit 70 in this period.

Accordingly, for example, when a period from when the drive command signal Sa becomes the high level and continues at the high level for over 20 ms until when a predetermined margin time elapses after the drive command signal Sa returns to the low level is set as a drive system monitoring period, a falling edge occurs once in the peak current detection signal Sb during the drive system monitoring period, while, a falling edge occurs three or more times in the high-side FET drive detection signal Sc during the drive system monitoring period.

As shown in the box [1], if the current passage between the high-side FET 67 and the coil 35a (referred to as "high-side current passage" hereinafter) is short-circuited to the ground line, since no current flows through the coil 35a and the resistor 66, the monitor current Im and the output of the amplifier circuit 69 become 0.

As a result, the output of the comparator circuit 70 as the high-side FET drive detection signal Sc remains at the high level while the drive command signal Sa is at the high level, and becomes the low level when the drive command signal Sa changes to the low level. On the other hand, the peak current detection signal Sb continues to be at the high level. Accordingly, no falling edge occurs in the peak current detection signal Sb during the drive system monitoring period, while a falling edge occurs once in the high-side FET drive detection signal Sc during the drive system monitoring period.

Incidentally, if the high-side current passage is short-circuited to the ground line, a large current flows not through the coil 35a when the high-side FET 67 is turned on. As a measure against this, an over-current protection circuit which forcibly turns off the high-side FET 67 if the current flowing through the high-side FET 67 exceeds a predetermined threshold current may be provided.

As shown in the box [2], also if a current passage between the coil 35a and the low-side FET 65 (referred to as "low-side current passage" hereinafter) is short-circuited to the ground line, since no current flows through the resistor 66, the monitor current Im and the output of the amplifier circuit 69 become 0.

As a result, the output of the comparator circuit 70 as the high-side FET drive detection signal Sc remains at the high level while the drive command signal Sa is at the high level, and becomes the low level when the drive command signal Sa changes to the low level. On the other hand, the peak current detection signal Sb continues to be at the high level. Accordingly, no falling edge occurs in the peak current detection signal Sb during the drive system monitoring period, while a falling edge occurs once in the high-side FET drive detection signal Sc during the drive system monitoring period.

Incidentally, if the low-side current passage is short-circuited to the ground line, a current continues to flow from the high-side FET 67 to the coil 35a while the drive command signal Sa is at the high level.

To prevent the current flowing continuously, an over-current protection circuit set at a relatively low threshold current may be provided.

As shown in the box [3], if the high-side current passage is short-circuited to the battery voltage VB, a current continues to flow from the battery to the coil 35a and the resistor 66 while the drive command signal Sa is at the high level (that is, while the low-side FET 65 is on) irrespective of the on/off state of the high-side FET 67.

Accordingly, when the monitor current Im, which is equal to the coil current in this case, reaches the peak current Ip after the drive command signal Sa becomes the high level, both the peak current detection signal Sb and the high-side FET drive detection signal Sc change from the high level to the low level. As a result, the high-side FET 67 is turned off, however, the current continues to flow through the coil 35a and the resistor 66 keeping the relationship of the second threshed value≦the output of the amplifier circuit 69, causing the high-side FET detection signal Sc to remain at the low level. Accordingly, during the monitoring period, a falling edge occurs only once in each of the peak current detection signal Sb and the high-side FET drive detection signal Sc.

As shown in the box [4], if the low-side current passage is short-circuited to the battery voltage VB, although no current flows through the coil 35a, a current continues to flow from the battery to the resistor 66 while the drive command signal Sa is at the high level causing the low-side FET 65 to turn on.

Accordingly, as in the case of the high-side current passage being short-circuited to the battery voltage VB, when the monitor current Im reaches the peak current Ip after the drive command signal Sa becomes the high level, both the peak current detection signal Sb and the high-side FET drive detection signal Sc change from the high level to the low level. Thereafter, the high-side RET drive detection signal Sc remains at the low level, because the current continues to flow from the battery to the coil 35a, keeping the relationship of the second threshold value≦the output of the amplifier circuit 69. Accordingly, during the monitor period, a falling edge occurs only once for each of the peak current detection signal Sb and the high-side FET drive detection signal Sc.

Incidentally, as seen from the dotted lines in the boxes [3] and [4], the rising slope of the monitor current Im is steeper when the low-side current passage is short-circuited to the battery voltage VB than when the high-side current passage is short-circuited to the battery voltage VB. This is because the current flows through the resistor 66 not through the coil 35a.

If any one of the high-side current passage and the low-side current passage is short-circuited to the battery voltage VB, a current of a value exceeding a normal range flows through the low-side FET 65. Accordingly, in this embodiment, as the low-side PET 65, a FET which can resist several occurrences of such a large current lasting 20 to 30 ms is used.

A protection circuit which forcibly turn off the low-side FET 65 upon detecting overheat or over-current in the low-side FET 65 may be provided. When such a protection circuit is provided, if the high-side current passage or the low side current passage is short-circuited to the battery voltage VB causing the drive command signal Sa to become the high level, there is a possibility that the low-side FET 65 is forcibly turned off by the protection circuit when both the peak current detection signal Sb and the high-side FET drive detection circuit Sc change from the high level to the low level after the monitor current Im reaches the peak current Ip. When the low-side FET 65 is forcibly turned off, since the monitor current Im becomes 0, and the relationship of the threshold value>the output of the amplifier circuit 69 holds in the comparator circuit 70, the high-side FET drive detection signal Sc becomes the high level again, and thereafter returns to the low level when the drive command signal Sa becomes the low level. Accordingly, when the protection circuit is provided for protecting the low-side FET 65, a falling edge may occur twice in the high-side FET drive detection circuit Sc during the monitoring period.

As shown in the boxes [5] and [6], if any one of the high-side current passage and the low-side current passage is broken, since no current flows through the coil 35a and the resistor 66, the monitor current Im and the output of the amplifier circuit 69 become 0. Accordingly, no falling edge occurs in the peak current detection signal Sb during the monitoring period, while a falling edge occurs once in the high-side FET drive detection signal Sc during the monitoring period.

Next, an exhaust pipe injection control process performed by the microcomputer 60 at regular time intervals is explained with reference to FIG. 5.

Figure 5:
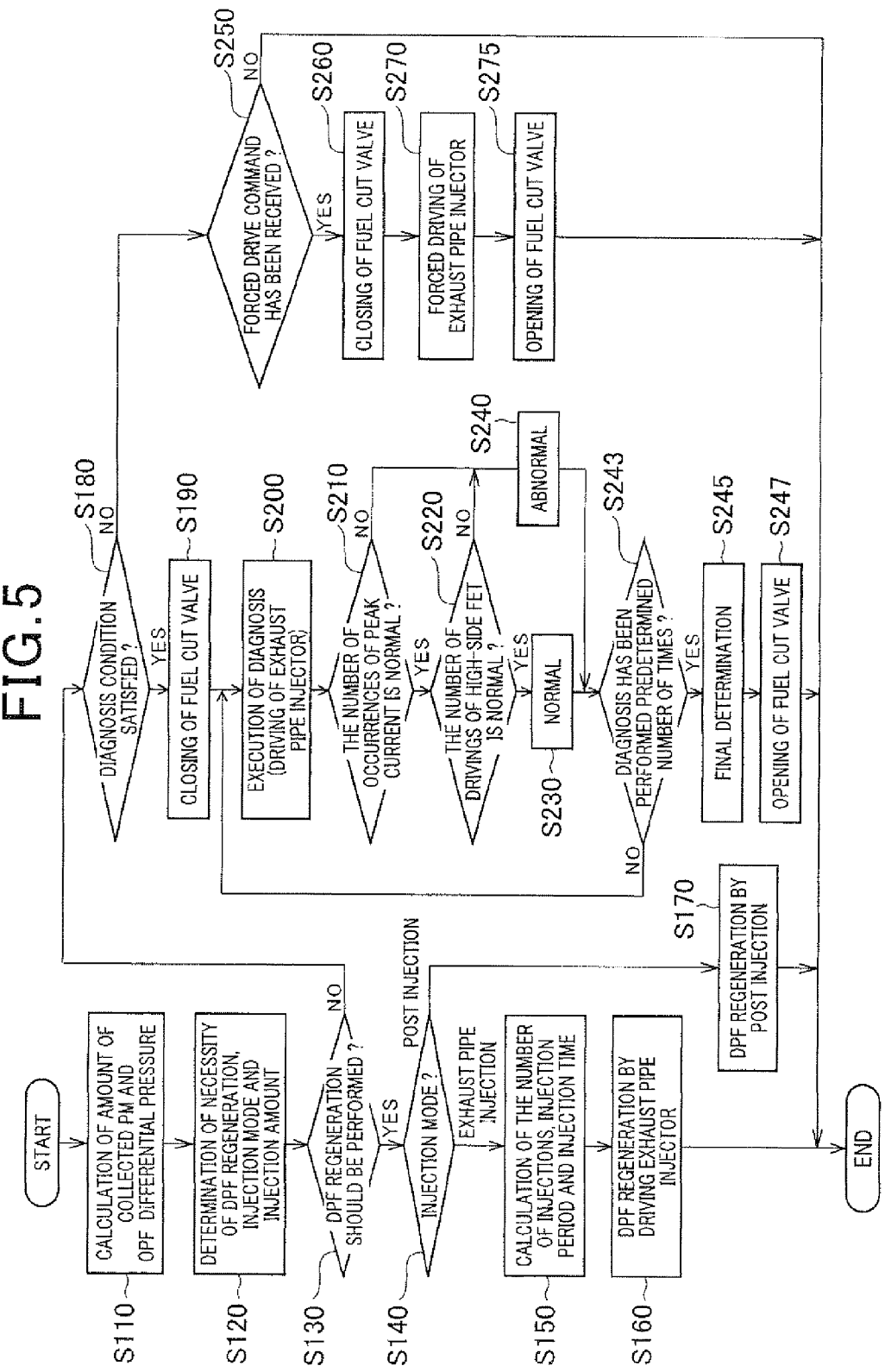
FIG. 5 is a flowchart showing an exhaust pipe injection control process performed by the ECU.

As shown in FIG. 5, this process begins by estimating an amount of collected PM in the DPF 31 on the basis of the cumulative running time of the engine 10, cumulative amount of injected fuel, etc., and calculating the differential pressure across the DPF 31 on the basis of the output of the differential pressure sensor 41 at step S110.

At subsequent step S120, a determination is made as to the necessity of performing the DPF regeneration (regeneration of the DPF 31), and also a determination is made as to which of the exhaust pipe injection mode (the mode in which fuel is injected from the exhaust pipe injector 35) and the post injection mode (the mode in which fuel is injected from the injector 17) is appropriate for the DPF regeneration, while calculating the amount of fuel to be injected for the DPF regeneration on the basis of the temperatures of the exhaust gas measured by the temperature sensors 43 and 45.

Subsequently, it is determined at step S130 whether or not the DPF regeneration should be performed on the basis of the determination results at step S120. If the determination result at step S130 is affirmative, the process proceeds to step S140 to determine in which of the exhaust pipe injection mode and the post injection mode the DPF regeneration should be performed.

If it is determined that the DPF regeneration should be performed in the exhaust pipe injection mode at step S140, the process proceeds to step S150 where the number of times of fuel injection, injection period and injection time of each injection to inject fuel from the exhaust pipe injector 35 by the amount calculated at step S120 are determined.

Thereafter, the DPF is regenerated at step S160 by driving the exhaust pipe injector 35 in accordance with the determination results at step S150. In more detail, the operation to set the drive command signal Sa applied to the exhaust pipe driver circuit 63 to the high level over the injection time is performed for each injection period by the number of times of fuel injection, and then the process is terminated.

If it is determined that the DPF regeneration should be performed in the post injection mode at step S140, the process proceeds to step 170 where the injector 17 is driven such that the total amount of post-injected fuel becomes equal to the amount calculated at step 120, and then the process is terminated.

On the other hand, if the determination result at step S130 is negative, the process proceeds to step S210 where it is determined whether or not a diagnosis performing condition to perform a drive system diagnostic process on the exhaust pipe injector 35 is satisfied. The drive system diagnostic process is a process to determine whether the energization of the coil 35a is being performed normally on the basis of the number of falling edges of the peak current detection signal Sb and the number of falling edges of the high-side FET drive detection signal Sc when the exhaust pipe injector driver circuit 63 is driven. The diagnosis performing condition is assumed to be satisfied if all of the following conditions (a) to (c) are satisfied.

(a) A predetermined time equal to a diagnosis performing period has elapsed since the drive system diagnosis was performed last time.

(b) The battery voltage VB is above a predetermined voltage.

The predetermined voltage is set to a voltage which enables the coil current to reach the peak current Ip with certainty when the drive command signal Sa outputted from the microcomputer 60 is kept at the high level for a predetermined time period to drive the exhaust pipe injector 35 at the later described step S200. Although not shown in FIG. 2, the ECU 1 is provided with resistors to divide the battery voltage VB. The microcomputer 60 A/D-converts the voltage divided by the resistors to detect the battery voltage VB.

(c) There is a sufficient time before the condition to perform the DPF regeneration is satisfied. For example, each of the differential pressure and the amount of collected PM calculated at step S110 is smaller than a predetermined value. This is to avoid a situation in which the condition to perform the DPF regeneration is satisfied while the drive system diagnosis on the exhaust pipe injector 35 is being performed, and the DPF regeneration is disturbed by the drive system diagnosis process being performed.

If the determination result at step S180 is affirmative, the drive system diagnosis is performed at steps S190 to S247 as described below. At step S190, the fuel cut valve driving signal applied to the fuel cut valve driver circuit 64 is set to the active level to close the fuel cut valve 39 to thereby shut off fuel supply to the exhaust pipe injector 35.

Subsequently, at step S200, the drive command signal Sa applied to the exhaust pipe injector driver circuit 63 is set to the high level for a predetermined time (20 ms or longer, 25 ms in this embodiment) in order to cause the exhaust pipe driver circuit 63 to drive the exhaust pipe injector 35. For each of the peak current detection signal Sb and the high-side FET drive detection signal Sc, falling edges are counted up during a 30 ms period as a monitoring period from the time at which the drive command signal Sa is set to the high level until a predetermined margin time (5 ms in this embodiment) elapses after the drive command signal Sa is reset to the low level.

When the monitoring period elapses, the process proceeds to step S210 where it is determined whether or not the number of falling edges of the peak current detection signal Sb (the number of times that the peak current has occurred) counted at step S200 is a normal number, that is whether or not it is 1 (see block [0] in FIG. 4). If the determination result at step S210 is affirmative, the process proceeds to step S220.

At step S220, it is determined whether or not the number of falling edges of the high-side FET drive detection signal Sc (the number of times that the high-side FET has been driven) counted at step S200 is a normal number, that is whether or not it is 3 or more (see block [0] in FIG. 4). If the determination result at step S220 is affirmative, the process proceeds to step S230.

At step S230, a provisional determination that the drive system of the exhaust pipe injector 35 is normal is made, and then the process proceeds to step S243. If the determination result at step S210 is negative, or the determination result at step S220 is negative, the process proceeds to step S240.

In this case, it can be assumed that the energization of the coil 35a is not performed normally, and a fault shown in one of the blocks [1] to [6] in FIG. 4 has occurred.

Accordingly, a provisional determination that there is a fault in the drive system of the exhaust pipe injector 35 is made, and then the process proceeds to step S243. At step S243, it is determined whether or not step S200 to step S243 have been performed a predetermined number of times (three times in this embodiment). If the determination result at step S243 is negative, the process returns to step S200.

If the determination result at step S243 is affirmative, the process proceeds to step S245. At step S245, a final determination whether or not the drive system of the exhaust pipe injector 35 is in a normal state is made. In this embodiment, if the provisional determination at step S230 is affirmative for each of the predetermined number of executions of step S230, a final affirmative determination is made, and if the provisional determination at step S240 is negative for each of the predetermined number of executions of step S230, a final negative determination is made. In the cases other than the above, the previous final determination is held without renewing the final determination. Alternatively, the final determination may be determined to be one of the provisional affirmative determination and the provisional negative determination, which has occurred more times than the other.

At subsequent step S247, the fuel cut valve drive signal applied to the fuel cut valve driver circuit 64 is set to the non-active level to open the fuel cut valve 39, to thereby resume fuel supply to the exhaust pipe injector 35. Thereafter, the process is terminated.

If the determination result at step S180 is negative the process proceeds to step S250. At step S250, it is determined whether or not a forced drive request requesting to forcibly drive the exhaust pipe injector 35 has been received. If the determination result at step S250 is negative, the process is terminated.

If the determination result at step S250 is affirmative, the process proceeds to step S260 where the fuel cut valve 39 is closed to thereby shut off fuel supply to the exhaust pipe injector 35 in the same way as in step S190.

At subsequent step S370, the drive command signal Sa applied to the exhaust pipe injector driver circuit 63 is set to the high level for a predetermined forced drive time, or if the received forced drive request designates a drive time, for this designated drive time, to cause the exhaust pipe injector driver circuit 63 to drive the exhaust pipe injector 35.

Figure 6:
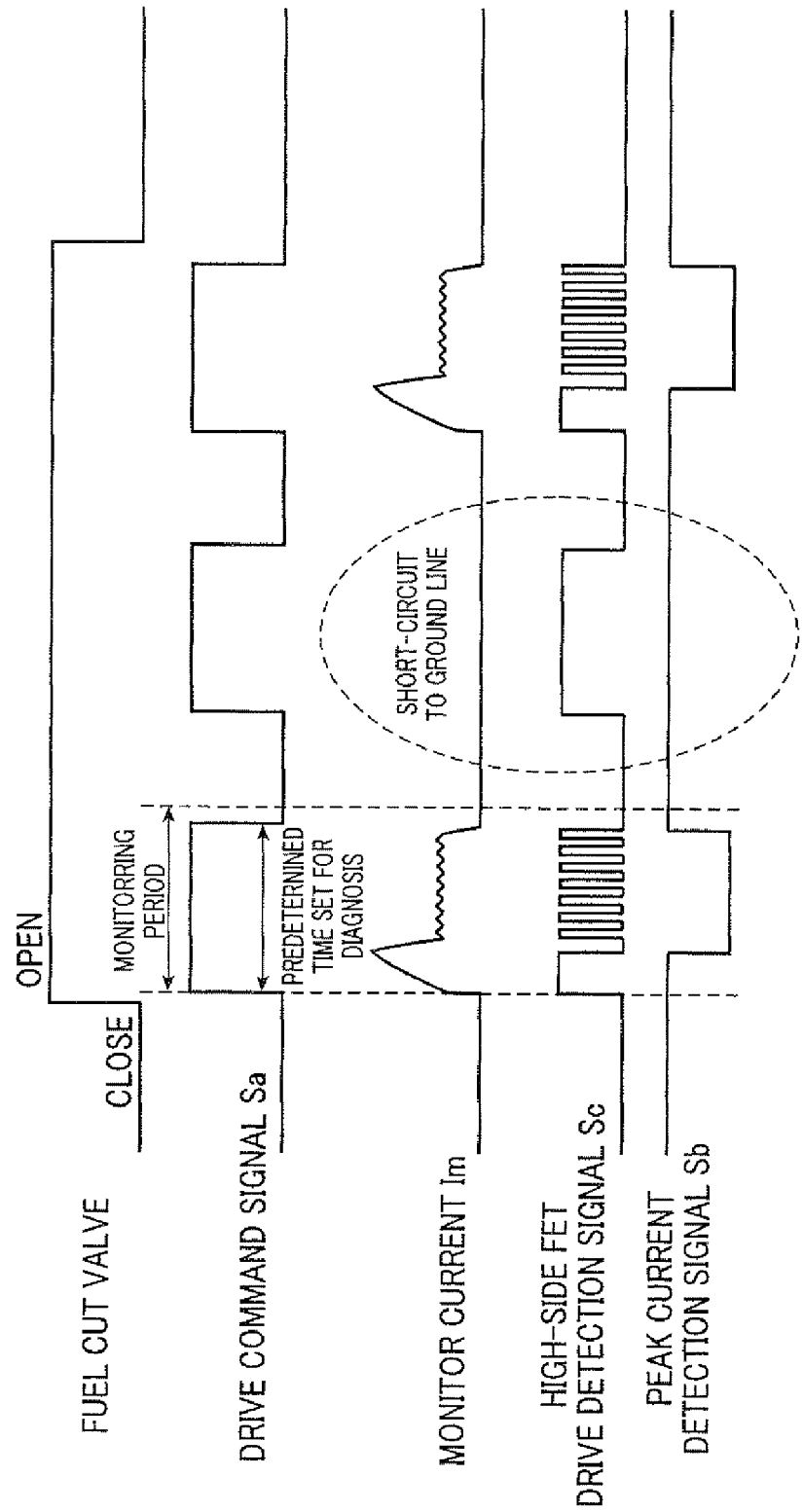
FIG. 6 is a time chart for explaining a drive system diagnosis performed by the ECU.

At subsequent step S275, the fuel cut valve 39 is opened to resume fuel supply to the exhaust pipe injector 35 in the same way as in step S247. Thereafter, the process is terminated. The above described ECU 1 provides the following advantages. When the diagnosis performing condition is satisfied (step S180 in FIG. 5), the ECU 1 closes the fuel cut valve 39 as shown in FIG. 6, to thereby shut off fuel supply to the exhaust pipe injector 35 (step S190).

In this state, the operation in which the drive command signal Sa is set to the high level for the predetermined time to cause the exhaust pipe injector driver circuit 63 to drive the exhaust pipe injector 35 is performed repeatedly three times. Also, at this time, falling edges are counted up for each of the peak current detection signal Sb and the high-side FET drive detection signal Sc. A determination is made that energization from the exhaust pipe injector driver circuit 63 to the coil 35a is not performed normally and there is a fault in the drive system of the exhaust pipe injector 35 (step S240), if the condition that the number of the counted falling edges of the peak current detection signal Sb is 1, and the number of the counted falling edges of the high-side RET drive detection signal Sc is 3 or more (step S210 and step S230) is not satisfied. Actually, as described in the foregoing, a final determination is made on the basis of the provisional determinations made while the above operation is performed three times. FIG. 6 shows the case where the fault shown in the block [1] or [2] (a short circuit of the high-side current passage to the ground line, or a short circuit of the low-side current passage to the ground line) has occurred when the operation is performed for the second time.

That is, the drive system diagnosis is performed by driving the exhaust pipe injector driver circuit 63 while fuel supply to the exhaust pipe injector 35 is shut off.

Accordingly, although the drive system diagnosis is performed at a timing different from the timing at which the DPF regeneration is performed, no extra fuel is injected into the exhaust pipe 23, and drive system diagnosis can be performed at an arbitrary timing with higher frequency than the frequency with which the DPF regeneration is performed. This makes it possible to prevent a time delay between when a fault occurs in the drive system of the exhaust pipe injector 35 and when the fault is detected from being prolonged.

In addition, since the time period during which the exhaust pipe injector driver circuit 63 operates to perform the drive system diagnosis can be set to a desired length irrespective of fuel injection for the DPF regeneration, the drive system diagnosis can be performed stably and correctly.

The condition to perform the drive system diagnosis (step S190 to step S247 in FIG. 5) includes that the battery voltage VB is above a predetermined voltage. This makes it possible to make an erroneous determination due to lowering of the battery voltage VB. For example, if the battery voltage VS is excessively Low, the coil current does not reach the peak current Ip when the drive command signal Sa is set to the high level at step S220 in FIG. 5 even if there is no fault. As a result, since the peak current detection signal Sb does not fall but remains at the high level, an erroneous determination that there is a fault may be made. According to this embodiment, it is possible to prevent such an erroneous determination from being made.

Incidentally, even when the fuel cut valve 39 is closed at the time of performing the drive system diagnosis, a slight amount of fuel may be injected from the exhaust pipe injector 35, because some fuel pressure remains in the fuel supply passage 37 between the fuel cut valve 39 and the exhaust pipe injector 35.

To avoid such an injection, the condition to perform the diagnosis at step S180 in FIG. 5 may further include that the vehicle ignition switch is switched from off to on. This is because, since the fuel pump 13 does not operate when the ignition switch is off, and accordingly the fuel pressure in the fuel supply passage 37 decreases, the fuel pressure immediately after the ignition switch is turned on is sufficiently low.

By the same reason, the condition to perform the diagnosis at step S180 in FIG. 5 may further include that a predetermined time has elapsed from when the ignition switch is turned on.

The ECU 1 of this embodiment is configured to close the fuel cut valve 39 (step S260) upon receiving the Forced drive request, and forcibly drive the exhaust pipe injector 35 (step S270) in this state. This makes it possible to forcibly drive the exhaust pipe injector 35 at any timing without injecting extra fuel into the exhaust pipe 23.

Second Embodiment

Figure 7:
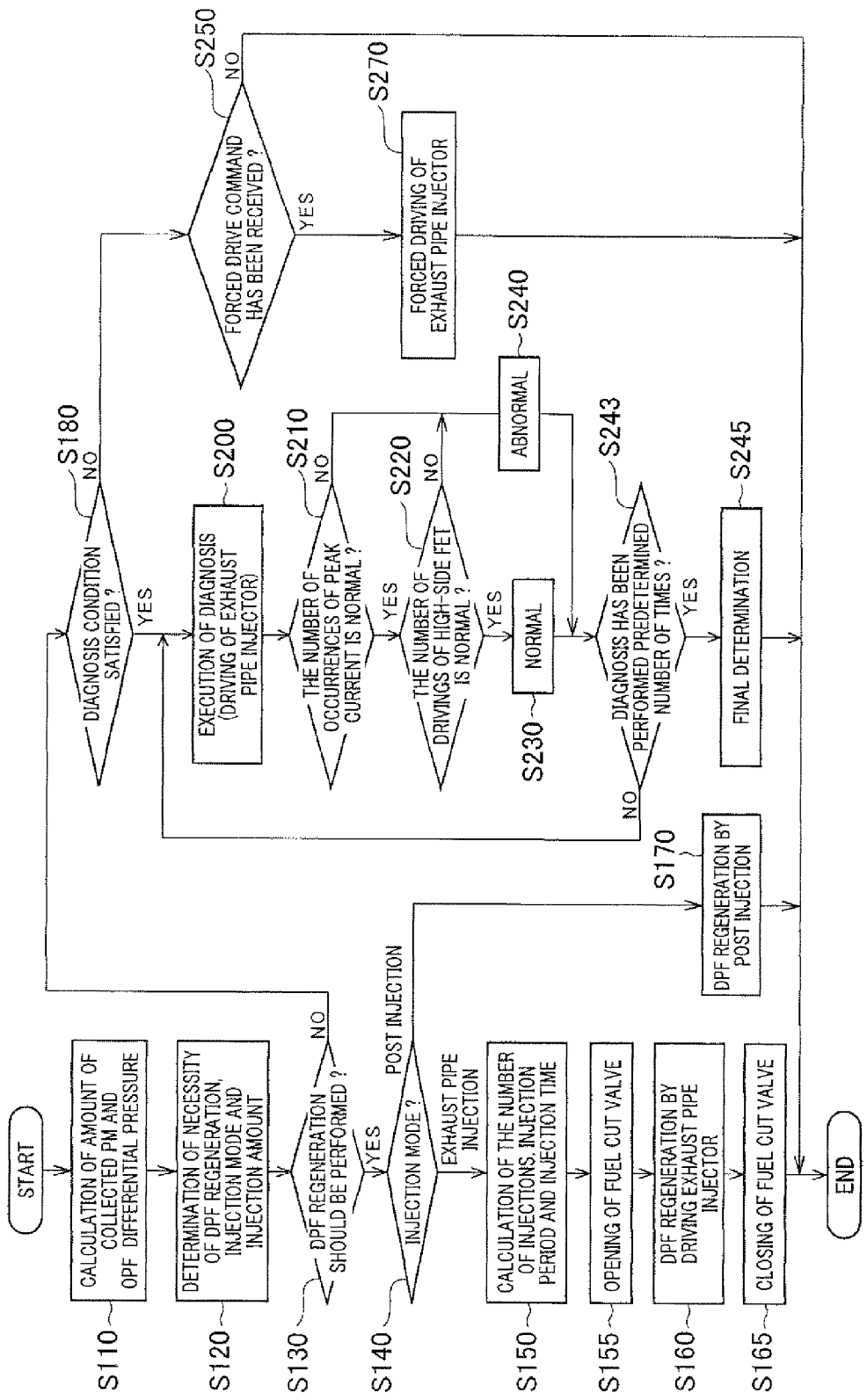
FIG. 7 is a flowchart showing an exhaust pipe injection control process performed by an ECU according to a second embodiment of the invention.

Next, a second embodiment of the invention is described with reference to FIG. 7. In FIG. 7, the same step numbers as those in FIG. 5 are assigned to the same operations. The ECU 1 of the second embodiment differs from the ECU 1 of the first embodiment in the content of the exhaust pipe injection control process performed by the microcomputer 60.

The exhaust pipe injection control process shown in FIG. 7 does not include steps S190, S247, S260 and S275 which are included in the exhaust pipe injection control process shown in FIG. 5, however, includes steps S155 and S165 instead.

Also, in the second embodiment, a normally-close type electromagnetic valve is used as the fuel cut valve 39 in the exhaust pipe injection control process shown in FIG. 7, after completion of step S150, the process proceeds to step S155 to open the fuel cut valve 39, and then proceeds to step S160 to drive the exhaust pipe injector 35 to thereby regenerate the DPF 31. Thereafter, the process proceeds to step S165 to close the fuel cut valve 39, and then the process is terminated.

As explained above, the ECU 1 of the second embodiment is configured to open the fuel cut valve 39 to supply fuel to the exhaust pipe injector 35 only when the exhaust pipe injector 35 is driven to perform the DPF regeneration. Accordingly, since drive system diagnosis and the forced drive of the exhaust pipe injector 35 are performed in the state of fuel supply to the exhaust pipe injector 35 being shut off, the second embodiment provides the same advantages as the first embodiment.

It is a matter of course that various modifications can be made to the above embodiments as described below.

In the above embodiments, fuel supply to the exhaust pipe injector 35 is shut off by the fuel cut valve 39. However, when the embodiments are configured to supply fuel by a fuel pump different from the fuel pump 13 for feeding fuel to the common rail 15, fuel supply to the exhaust pipe injector 35 may be shut off by stopping this fuel pump.

The drive system diagnosis may be different from that described in the above embodiments. For example, it may be such as to set the drive command signal Sa to the high level for a predetermined time period, A/D-converts the output of the amplifier circuit 69 during this time period, and determines whether or not the A/D converted value as the coil current varies normally as shown in FIG. 3.

Incidentally, EGR cannot be performed during post injection. This is because if the EGR valve 29 is opened during post injection, since air mixed with fuel is taken in the cylinder 11 through the EGR passage 25, fuel combustion cannot be controlled. On the other hand, when the exhaust pipe injector 35 is used for the DPF regeneration, EGR and the DPF regeneration can be performed at the same time. However, to cover a case where an amount of fuel necessary to regenerate the DPF 31 cannot be injected only by the exhaust pipe injector 35, the above embodiments are configured that the DPF regeneration can be performed also by post injection.

Accordingly, if an amount of fuel necessary to regenerate the DPF 31 can be injected always only by the exhaust pipe injector 35, the above embodiments may be modified not to perform the DPF regeneration by post injection.

The above explained preferred embodiments are exemplary of the invention of the present application which is described solely by the claims appended below. It should be understood that modifications of the preferred embodiments may be made as would occur to one of skill in the art.

What is claimed is:

1. A particulate filter regeneration apparatus comprising:
   a driving unit configured to drive an exhaust pipe injector to inject fuel into an exhaust pipe of an internal combustion engine by energizing an actuator of said exhaust injector in order to regenerate a particulate filter provided in said exhaust pipe for collecting particulate matter contained in exhaust gas of said engine;
   a fuel shutoff valve configured to shut off fuel supply to said exhaust pipe injector; and
   a diagnosis unit configured to perform a diagnostic process in which said fuel shutoff valve is caused to shut off fuel supply to said exhaust pipe injector, and said driving unit is configured to energize said activator in a state of fuel supply to said exhaust pipe injector being shut off by said fuel shutoff valve so that the fuel shutoff valve is closed prior to energizing the actuator in order to make a determination whether said actuator is energized normally by said driving unit; wherein
   the diagnostic process is performed by the diagnosis unit when a condition is satisfied;
   said condition is that a voltage of a batter of a vehicle having said internal combustion engine is above a predetermined voltage; and
   the predetermined voltage corresponds to a voltage which enables a current of a coil in the exhaust pipe injector to reach a peak current.

2. A method of operating a particulate filter regeneration apparatus including a driving function for driving an exhaust pipe injector to inject fuel into an exhaust pipe of an internal combustion engine in order to regenerate a particulate filter provided in said exhaust pipe for collecting particulate matter contained in exhaust gas of said engine, and a fuel supply shutoff valve for shutting off fuel supply to said exhaust pipe injector, said method comprising:
   driving said exhaust pipe injector to inject fuel into said exhaust pipe by energizing an actuator of said exhaust pipe injector to regenerate said particulate filter; and
   causing said driving function to energize said actuator while causing said fuel supply shutoff valve to shut off fuel supply to said exhaust pipe injector so that the fuel supply shutoff valve is closed prior to energizing the actuator to perform diagnosis on said driving function; wherein
   the diagnosis is performed when a condition is satisfied;
   said condition is that a voltage of a battery of a vehicle having said internal combustion engine is above a predetermined voltage; and
   the predetermined voltage corresponds to a voltage which enables a current of a coil in the exhaust pipe injector to reach a peak current.

* * * * *